(12) United States Patent
Aoki et al.

(10) Patent No.: US 11,103,818 B2
(45) Date of Patent: Aug. 31, 2021

(54) FILTER DEVICE AND WATER HEATER

(71) Applicant: PURPOSE CO., LTD., Fuji (JP)

(72) Inventors: Toshiaki Aoki, Fuji (JP); Tetsuya Oishi, Fuji (JP); Kyohei Matsushita, Fuji (JP)

(73) Assignee: PURPOSE CO., LTD., Fuji (JP)

( * ) Notice: Subject to any disclaimer, the term of this patent is extended or adjusted under 35 U.S.C. 154(b) by 267 days.

(21) Appl. No.: 16/151,729

(22) Filed: Oct. 4, 2018

(65) Prior Publication Data

US 2019/0126179 A1 May 2, 2019

(30) Foreign Application Priority Data

Oct. 31, 2017 (JP) .............................. JP2017-209920

(51) Int. Cl.
*B01D 45/02* (2006.01)
*B01D 50/00* (2006.01)
(Continued)

(52) U.S. Cl.
CPC ............. *B01D 45/02* (2013.01); *B01D 45/06* (2013.01); *B01D 46/103* (2013.01);
(Continued)

(58) Field of Classification Search
CPC .... B01D 46/103; B01D 45/06; B01D 50/002; B01D 45/02; F24H 9/2035; F24H 1/205; F23L 99/00
See application file for complete search history.

(56) References Cited

U.S. PATENT DOCUMENTS

| 6,318,403 B1* | 11/2001 | Fritz ....................... F16K 15/03 122/504 |
| 2011/0233116 A1* | 9/2011 | Moe ........................ B01D 35/14 210/86 |

(Continued)

FOREIGN PATENT DOCUMENTS

| JP | H04-102619 U | 9/1992 |
| JP | 6-34203 A | 2/1994 |

(Continued)

OTHER PUBLICATIONS

Office Action dated Jan. 12, 2021, issued in counterpart JP Application No. 2017-209920, with English Translation. (10 pages).

*Primary Examiner* — Steven S Anderson, II
(74) *Attorney, Agent, or Firm* — Westerman, Hattori, Daniels & Adrian, LLP

(57) ABSTRACT

The filter device includes a supply air introducing part, a filter main body part and a discharge part. The supply air introducing part takes in an outside air. The filter main body part includes a ventilation pipe connected to the supply air introducing part to allow the outside air to flow through the ventilation pipe and a filter housing part being equipped with an outflow hole allowing the outside air to flow outside at a position higher than a position of the opening part of the ventilation pipe to separate, from the outside air, a liquid in a liquid state or a state close thereto. The liquid is taken in together with the outside air. The discharge part discharges at least the separated liquid from the filter main body part.

5 Claims, 7 Drawing Sheets

(51) Int. Cl.
  *F24H 1/20*    (2006.01)
  *F24H 9/20*    (2006.01)
  *F23L 99/00*   (2006.01)
  *B01D 46/10*   (2006.01)
  *B01D 45/06*   (2006.01)

(52) U.S. Cl.
  CPC ............ *B01D 50/002* (2013.01); *F23L 99/00* (2013.01); *F24H 1/205* (2013.01); *F24H 9/2035* (2013.01)

(56) References Cited

U.S. PATENT DOCUMENTS

| | | | |
|---|---|---|---|
| 2011/0247309 A1* | 10/2011 | Smith | B04B 7/12 55/447 |
| 2015/0135956 A1 | 5/2015 | Holzwarth et al. | |
| 2018/0028955 A1* | 2/2018 | Zajac, Jr. | B01D 50/002 |

FOREIGN PATENT DOCUMENTS

| | | | |
|---|---|---|---|
| JP | 06034203 A | * | 2/1994 |
| JP | H07-051526 A | | 2/1995 |
| JP | 3018329 U | | 11/1995 |
| JP | H08-136060 A | | 5/1996 |
| JP | H08-323124 A | | 12/1996 |
| JP | 9-68346 A | | 3/1997 |
| JP | H11-182838 A | | 7/1999 |
| JP | 200125623 | * | 1/2001 |
| JP | 2008-272675 A | | 11/2008 |
| JP | 2012-122685 A | | 6/2012 |
| JP | 2014-237094 A | | 12/2014 |
| JP | 2017-066963 A | | 4/2017 |

* cited by examiner

FILTER DEVICE AND WATER HEATER

CROSS-REFERENCE TO RELATED APPLICATIONS

This application is entitled to the benefit of priority of Japanese Patent Application No. 2017-209920, filed on Oct. 31, 2017, the contents of which are hereby incorporated by reference.

BACKGROUND OF THE INVENTION i) Field of the Invention

The present disclosure relates to liquid separation of an air supply means taking in and supplying an outdoor outside air to a combustion means, and a technique of discharging a separated liquid.

ii) Description of the Related Art

A combustion apparatus such as an indoor installation type water heater takes in an outdoor outside air for air supply and discharges a combustion exhaust into outdoors for stabilization of a combustion state and enhancement of user's safety against combustion. When the taken-in outside air is used as a combustion air, removal of substances other than air is important. Specifically, foreign matter other than air such as floating dust may be taken into an air supply pipe having an opening part arranged outdoors. Such foreign matter other than air may cause, for example, abnormal rotation of an air supply fan or abnormal combustion of a combustion means.

Thus, some apparatuses include a filter device eliminating foreign matter at an entrance of an air supply pipe (e.g., Japanese Laid-Open Patent Publication No. 6-034203) or a filter device in an air supply part formed in a housing of a water heater (e.g., Japanese Laid-Open Patent Publication No. 9-068346).

BRIEF SUMMARY OF THE INVENTION

An air supply means using an air supply pipe has a problem that foreign matter in the solid state, similar foreign matter or a liquid such as rainwater enters together with the outside air. Such a liquid is hardly prevented from entering by a mesh filter etc. disposed on the intake port side of the air supply pipe and adheres to the filter to cause a problem that intake of the outside air is affected.

For example, the air supply pipe may be bent on the intake port side in a so-called termination elbow manner for making rainwater etc. harder to enter, such that an opening portion is directed downward. However, a building has a fixed position at which a combustion apparatus is disposed, and an air supply pipe and an exhaust pipe leading to the outside are arranged in advance for the installation position. Thus, changing the arrangement direction of the installed supply pipe may even require repair of a portion of the building, and the portion of the building may be a wall in which the air supply pipe is installed. The changing the arrangement direction causes a problem that workload and cost may increase.

Moreover, although moisture contained in the outside air is in the gas state or a state close thereto in the opening portion of the air supply pipe, the moisture may condense due to a temperature change etc. when the moisture comes inside the building or reaches the inside of the water heater, and may turn into the liquid state or a state close thereto.

Additionally, some water heaters have the air supply and exhaust parts reduced in diameter due to improvement in air supply and/or exhaust capability. If combustion air is supplied through the air supply part reduced in diameter at the same flow rate as the conventional case, the flow velocity of the outside air flowing in the air supply pipe increases. The flow velocity increased in the air supply pipe in this way causes a problem that rainwater etc. are easily sucked even if an opening part of the air supply pipe is arranged on the lower side.

An object of the present disclosure is to block a liquid such as rainwater and allow only the outside air to flow toward the combustion means.

Another object of the present disclosure is to implement removal of liquid without a workload of disposition of a filter device on a building etc. in which a water heater is installed.

An aspect of a filter device of the present disclosure includes a supply air introducing part, a filter main body part and a discharge part. The supply air introducing part takes in an outside air through the air supply pipe to be connected to the supply air introducing part. The filter main body part includes a ventilation pipe connected to the supply air introducing part to allow the outside air to flow through the ventilation pipe and a filter housing part in which a flow-through part is formed. The filter housing part allows the outside air entering from an opening part of the ventilation pipe to flow through the flow-through part. The opening part of the ventilation pipe is arranged in the filter housing part. The filter housing part is equipped with an outflow hole allowing the outside air to flow outside the flow-through part at a position higher than a position of the opening part to form a gas-liquid separating means separating, from the outside air, a liquid in a liquid state or a state close thereto. The liquid is taken in together with the outside air. The discharge part discharges, from the filter main body part, at least the liquid separated by the gas-liquid separating means.

An aspect of a water heater of the present disclosure includes a combustion means and a heat exchanger. The combustion means generates combustion exhaust. The heat exchanger heats water or a heating medium with the combustion exhaust. The water heater includes a filter device separating at least a liquid from the outside air entering from the air supply pipe taking an outdoor outside air into a housing of the water heater. The filter device allows the outside air to flow toward the combustion means. The filter device includes a supply air introducing part, a filter main body part and a discharge part. The supply air introducing part takes in the outside air through the air supply pipe to be connected to the supply air introducing part. The filter main body part includes a ventilation pipe connected to the supply air introducing part to allow the outside air to flow through the ventilation pipe and a filter housing part in which a flow-through part is formed. The flow-through part allows the outside air entering from an opening part of the ventilation pipe to flow through the flow-through part. The opening part of the ventilation pipe is arranged in the filter housing part. The filter housing part is equipped with an outflow hole allowing the outside air to flow outside the flow-through part at a position higher than a position of the opening part to form a gas-liquid separating means separating, from the outside air, the liquid in a liquid state or a state close thereto. The liquid is taken in together with the outside air. The discharge part discharges, from the filter main body part to the outside of the housing of the water heater, at least the liquid separated by the gas-liquid separating means.

BRIEF DESCRIPTION OF THE SEVERAL
VIEWS OF THE DRAWING

DETAILED DESCRIPTION OF THE
INVENTION

First Embodiment

Figure 1:
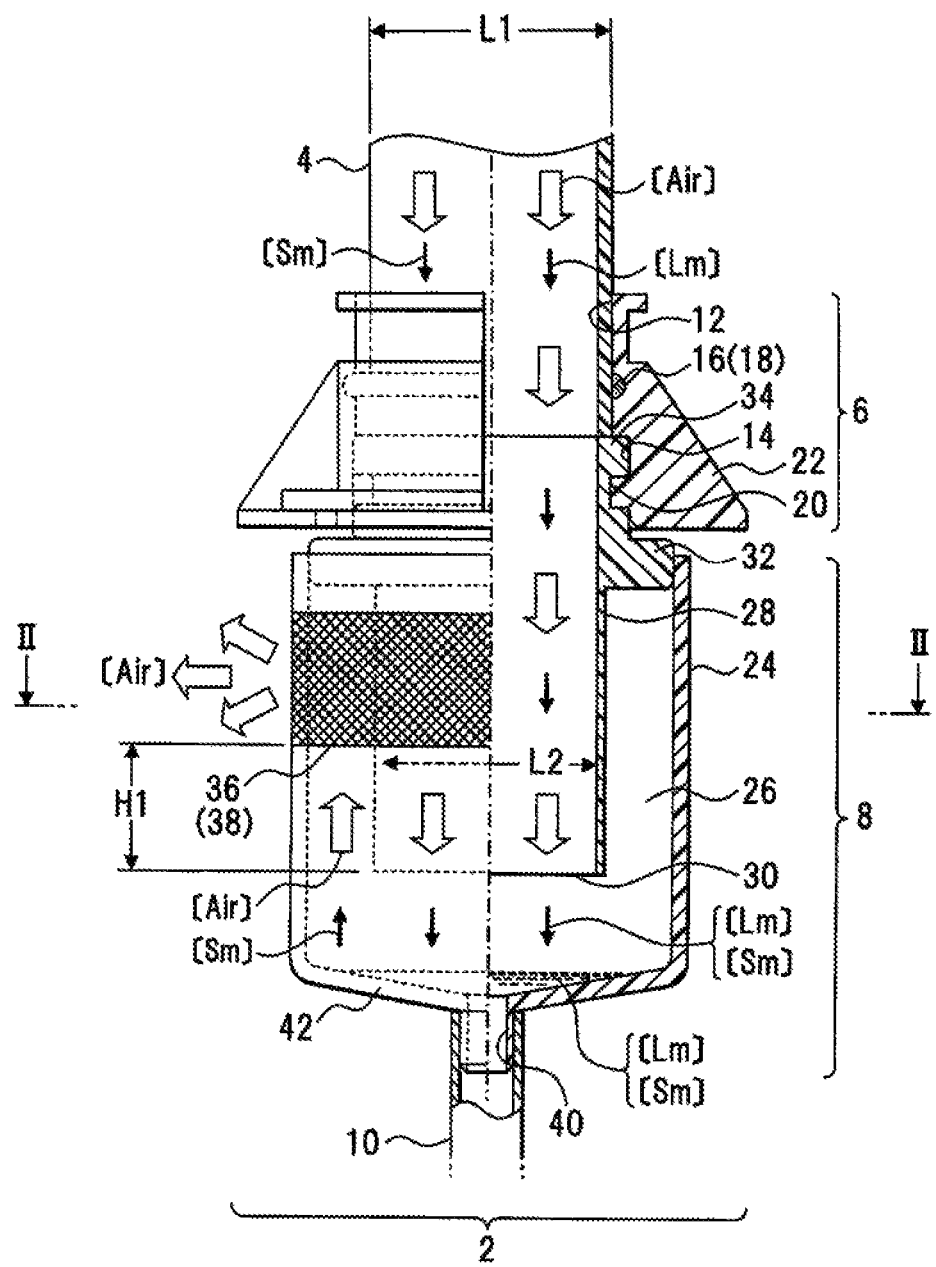
FIG. 1 is a view of a configuration example of a filter device according to a first embodiment.
Figure 2:
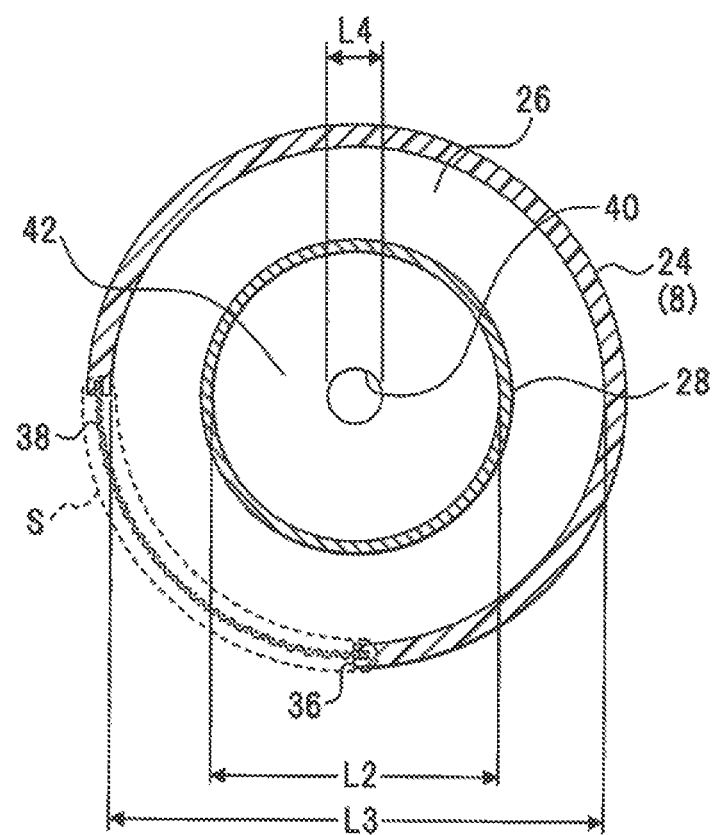
FIG. 2 is a cross-sectional view of an internal configuration example of a filter main body part.

FIG. 1 shows a configuration example of a filter device according to a first embodiment. FIG. 2 shows an internal configuration example of a filter main body part. The configurations shown in FIGS. 1 and 2 are examples, and the present invention is not limited to these configurations.

For example, as shown in FIG. 1, a filter device 2 is an example of a means separating a liquid and an air (Air) from an outside air flowing through an air supply pipe 4. The filter device 2 is disposed in an air supply part of a water heater etc. having a combustion means such as a burner and has a function of allowing only the air (Air) from the taken-in outside air to flow toward the combustion means for combustion while discharging a separated liquid.

The air supply pipe 4 is an example of a means taking in an outside air from an opening part arranged outdoors etc. and allowing the air to flow toward the air supply part of the water heater. The air supply pipe 4 is made of a resin material such as vinyl chloride or a metal material such as aluminum, for example. The air supply pipe 4 has, for example, an outer shape formed into a circular pipe shape of a predetermined size such that an air amount required for combustion of the combustion means can be taken in. The outside air flowing through the air supply pipe 4 may contain not only the air (Air) but also a liquid (Lm) such as rainwater or dew condensation water of vapor similar thereto, solid matter (Sm) such as small insects and floating dust, dirt, and sand, etc. The liquid (Lm) is an object to be separated by the filter device 2 and includes liquid matter other than rainwater and dew condensation water.

The filter device 2 includes, for example, a pipe connecting part 6, a filter main body part 8, and a discharge part 10.

[Configuration of the Pipe Connecting Part 6]

The pipe connecting part 6 is an example of a supply air introducing part of the present disclosure, is connected to one end side of the air supply pipe 4 to take the outside air into the filter device 2, and has a function of supporting a portion of the air supply pipe 4. The pipe connecting part 6 includes an air supply pipe accommodating part 12 accommodating therein the opening part side of the air supply pipe 4, for example. The air supply pipe accommodating part 12 has a shape corresponding to the outer shape of the air supply pipe 4 and has a diameter L1 allowing insertion of the outer diameter of the air supply pipe 4. The air supply pipe accommodating part 12 has an inner circumferential surface provided with, for example, a packing 16 and a groove 18 in which the packing 16 is disposed. The packing 16 is brought into contact with an outer circumferential portion of the air supply pipe 4 to prevent the air supply pipe 4 from coming off and to prevent leakage of the outside air between the surface and the air supply pipe 4.

A ventilation pipe accommodating part 14 is formed on the pipe connecting part 6, communicates with the air supply pipe accommodating part 12 and accommodates therein a ventilation pipe 28 of the filter main body part 8. The ventilation pipe accommodating part 14 is an example of a means connecting an opening part of the ventilation pipe 28 accommodated inside the ventilation pipe accommodating part 14 and an opening part of the air supply pipe 4 arranged in the air supply pipe accommodating part 12 to allow all the outside air to flow into the filter main body part 8. The ventilation pipe accommodating part 14 includes a locking part 20 that has, for example, an inner wall surface formed into an uneven shape and that is locked to an outer circumferential portion of the ventilation pipe 28. The ventilation pipe accommodating part 14 is opened in a size corresponding to the outer diameter of the ventilation pipe 28. The opening diameter of the ventilation pipe accommodating part 14 may be set equivalent to the opening diameter L1 of the air supply pipe accommodating part 12, for example.

The pipe connecting part 6 is arranged on a housing exterior portion of a water heater etc. not shown and includes multiple ribs 22 on an exterior surface for enhancement of a supporting strength. The pipe connecting part 6 may further include a flange part on the surface side facing the filter main body part 8, and the flange part may contact and be fixed to an apparatus housing not shown.

[Configuration of the Filter Main Body Part 8]

The filter main body part 8 includes, for example, an outer housing 24 and the ventilation pipe 28 arranged inside the outer housing 24. The outer housing 24 is an example of a filter housing part of the present disclosure and has a ventilation space 26 constituting a flow-through part allowing the outside air to flow therein. The outer housing 24 is made of a metal material or a hard resin material, for example. One end side of the ventilation pipe 28 is accommodated inside the ventilation space 26. Into the ventilation space 26, the outside air flowing through the ventilation pipe 28 flows from an opening part 30 of the ventilation pipe 28. Thus, for example, as shown in FIG. 2, the ventilation space 26 has a size acquired by subtracting an inner diameter L2 of the ventilation pipe 28 from an inner diameter L3 of the outer housing 24 and allows the outside air to flow around the opening part 30 side.

The ventilation pipe 28 is formed into a tubular shape. A large-diameter protruding part 32 is formed at an opening position of the filter main body part 8 facing the pipe connecting part 6, a locking convex part 34 is formed to be locked to the locking part 20 of the pipe connecting part 6, and the protruding part 32 and the locking convex part 34 are a portion of a body part of the ventilation pipe 28. The protruding part 32 of the ventilation pipe 28 functions as a lid part shielding and sealing the ventilation space 26 from the outside.

The lid part of the ventilation space 26 may be formed integrally with an outer circumferential portion of the ventilation pipe 28 or may be formed by disposing a separate member of a resin material etc. on a circumferential surface portion of the ventilation pipe 28.

The inner diameter L2 of the ventilation pipe 28 is formed equivalent to the inner diameter of the air supply pipe 4, for example. The inner diameter L2 of the ventilation pipe 28 may be formed smaller than the inner diameter of the air supply pipe 4.

The outer housing 24 is equipped with an outflow hole 36 at a position higher than a position of the opening part 30 of the ventilation pipe 28 accommodated in the ventilation space 26, and the outflow hole 36 allows the air (Air) in the ventilation space 26 to flow out.

A structure that the outflow hole 36 is formed at the position higher than the position of the opening part 30 in this way is an example of a gas-liquid separating means of the present disclosure, and the gas-liquid separating means includes the outflow hole 36 formed at the position higher than the position of the opening part 30, for example. Specifically, the ventilation space 26 has a flow passage formed such that the outside air flows along the outer circumference of the ventilation pipe 28 toward the outflow hole 36 above the opening part 30. In this case, the outside air entering from the ventilation pipe 28 includes the air (Air) having a small mass and the liquid (Lm) having a large mass, for example, and the air (Air) having the small mass can rise along this flow passage and reach the outflow hole 36. However, the liquid (Lm) having the large mass cannot raise or cannot reach the outflow hole 36 even when rising. As a result, the air (Air) and the liquid (Lm) included in the outside air can be separated.

For example, a predetermined height H1 is set between the opening part 30 of the ventilation pipe 28 and the outflow hole 36 such that the liquid (Lm) does not reach the height even if the liquid (Lm) floats up together with the air (Air) or splashes up when the liquid (Lm) comes into contact with a bottom part of the outer housing 24.

The outflow hole 36 is provided with a mesh filter 38 corresponding to the opening width of the outflow hole 36. The filter 38 is an example of a solid filter blocking passage of the solid matter (Sm) flowing together with the air (Air).

The bottom part of the outer housing 24 has a discharge hole 40 formed for collecting and allowing the separated liquid (Lm) and solid material (Sm) to flow to the discharge part 10. The discharge hole 40 is formed at a position lower than the position of the opening part 30 of the ventilation pipe 28 and is arranged at a position facing the opening part 30, for example. The discharge hole 40 is connected to a discharge pipe 44 (FIG. 3) that is a portion of the discharge part 10, for example. The bottom part of the outer housing 24 may have a tapered part 42 formed as a liquid collecting means on a circumferential edge portion of the discharge hole 40, for example. The tapered part 42 can be formed into a sloped shape around the discharge hole 40 to facilitate flow of the liquid into the discharge hole 40 and prevent the liquid from remaining in the ventilation space 26.

An opening diameter L4 of the discharge hole 40 is formed smaller than the inner diameter L2 of the ventilation pipe 28 as shown in FIG. 2, for example. The opening diameter L4 may have a different size depending on a state of the outside air to be supplied. Thus, depending on the environment in which an air supply means or the water heater including the filter device 2 is disposed, the opening diameter L4 of the discharge hole 40 may be made larger if a larger amount of the liquid (Lm) is mixed in the air supply means or the water heater at the time of taking-in of the outside air for the outside air containing a larger amount of moisture or for a region with a large rainfall. Alternatively, the opening diameter L4 may be formed narrower to reduce a discharge amount of the liquid (Lm) so that the solid matter (Sm) blocked by the filter 38 and accumulated on the bottom part of the outer housing 24 is discharged together with the liquid (Lm), for example. As a result, the liquid (Lm) stagnates on the tapered part 42 of the outer housing 24, and the solid matter (Sm) is mixed into the liquid (Lm). This can prevent the lightweight solid matter (Sm) from being blown up by the air (Air).

An opening width S of the outflow hole 36 is set depending on the inner diameter of the air supply pipe 4 or the inner diameter L2 of the ventilation pipe 28, for example. Specifically, the inner diameter of the air supply pipe 4 and the inner diameter L2 of the ventilation pipe 28 are set to such a size that the air (Air) can flow at a flow rate required for the combustion means of the water heater. In this embodiment, the inner diameter of the air supply pipe 4 is set to two inches or more, for example. The outflow hole 36 is opened in an area equivalent to or greater than the opening area of the inner diameter L1 of the air supply pipe 4, for example, so as not to make the supply of the air (Air) to the combustion means insufficient.

Although the outflow hole 36 is formed partially in the circumferential direction of the outer housing 24 in the described case, the present invention is not limited thereto. The outflow hole 36 may be opened entirely in the circumferential direction of the outer housing 24.

[Configuration of the Discharge Part 10]

Figure 3:
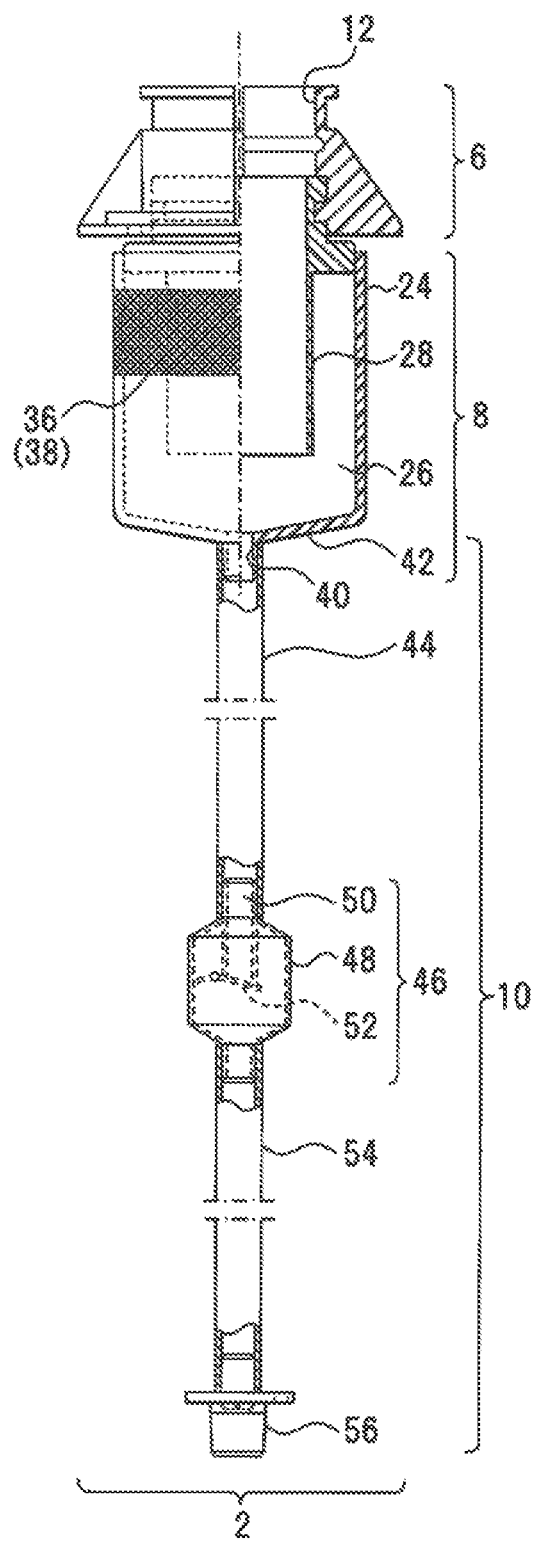
FIG. 3 is a view of a configuration example of a filter device including a discharge part.

FIG. 3 shows a configuration example of the filter device 2 including the discharge part 10.

As shown in FIG. 3, the discharge hole 40 of the outer housing 24 is connected to the discharge pipe 44 constituting the discharge part 10 allowing the separated liquid to flow. For the discharge pipe 44, a straight pipe or a bent pipe etc. is used depending on an arrangement structure inside the housing of the water heater in which the filter device 2 is disposed. The discharge part 10 includes a backflow preventing means 46 on a discharge flow passage, for example. The backflow preventing means 46 is an example of a means preventing air from flowing into the discharge hole 40 from a releasing part 56 of the filter device 2 and preventing the liquid from flowing back toward the filter main body part 8, for example. The backflow preventing means 46 includes, for example, a case part 48 formed larger in diameter than the discharge pipe 44 and causing the liquid or backward-flowing air to stagnate therein, a connecting pipe 50 connected to the discharge pipe 44, and a check valve 52 disposed at one end of the connecting pipe 50 and put into an open state by inflow from the discharge pipe 44.

The discharge part 10 further includes a discharge pipe 54 allowing the liquid passing through the backflow preventing means 46 to flow, and the releasing part 56 disposed in the housing of the water heater etc. to release the liquid.

[Another Configuration Example of the Discharge Part 10]

Figure 4:
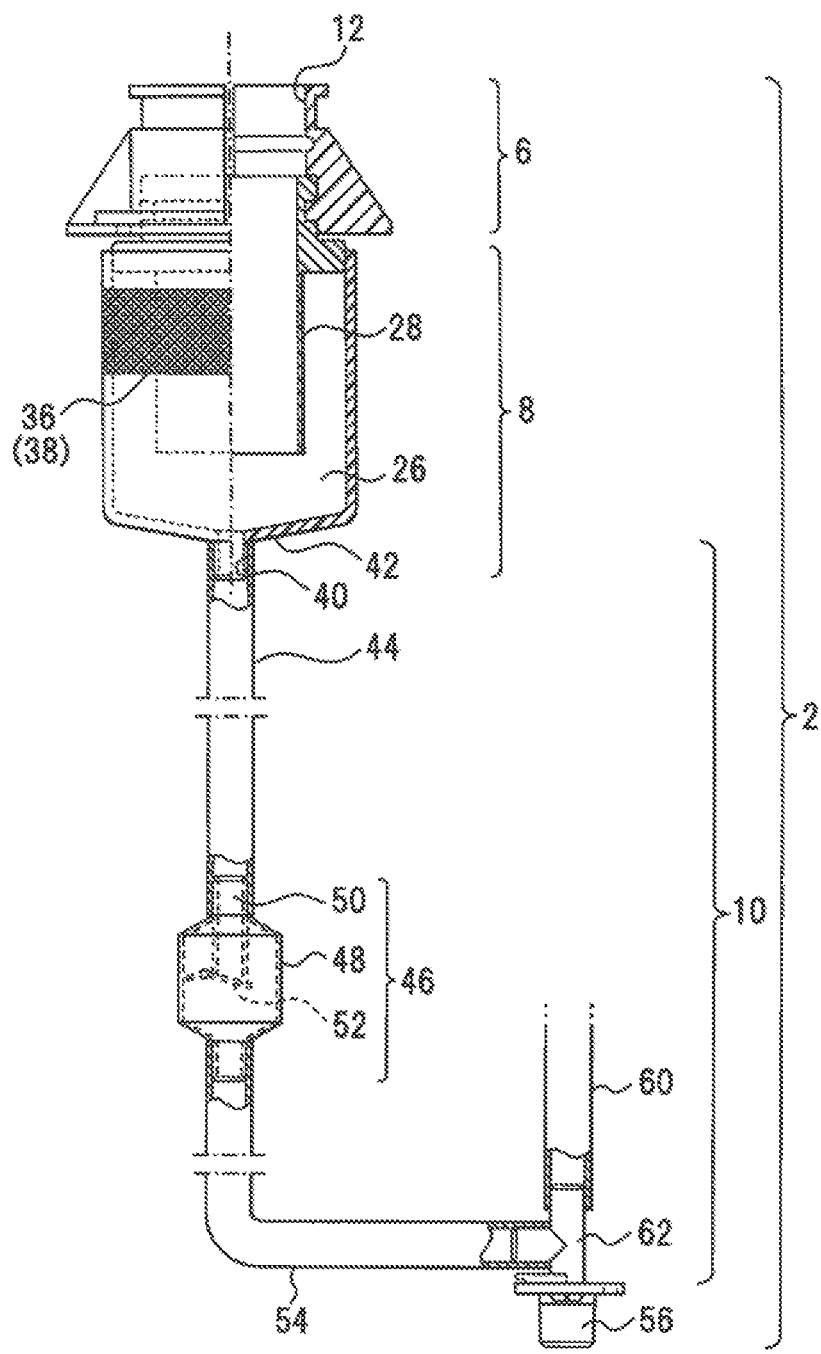
FIG. 4 is a view of a configuration example when the discharge part is connected to a predetermined pipe.

FIG. 4 shows a configuration example in the case of the discharge part connected to a predetermined pipe.

The discharge part 10 is not limited to the case of independently discharging the liquid to the outside the water heater etc. For example, as shown in FIG. 4, the discharge part 10 may discharge the liquid through a discharge means disposed in an apparatus on which the filter device 2 is disposed. In this case, the discharge pipe 54 may join via a branch pipe 62 to a discharge pipe 60 of an apparatus not shown, for example, to discharge the liquid by using a common releasing part 56. The branch pipe 62 may be, for example, a joint always in an open state or may include an opening/closing valve.

[Effects of the First Embodiment]

According to this configuration, the following effects can be obtained.

(1) The gas-liquid separating means can separate a flowing liquid together with an outside air or contained in the outside air, and supply air required for combustion.

(2) By establishing the structure allowing air to flow at a position higher than a position of the opening part of the ventilation pipe, the liquid having a large mass can be separated.

(3) By separating moisture such as water condensed from rainwater or outside air, the liquid can be prevented from adhering or accumulating inside the apparatus, and abnormal combustion of the combustion means can be prevented.

(4) Since the solid matter separated by the filter is mixed in the liquid and discharged, the solid matter etc. can be prevented from accumulating inside the filter device, and the filter function can be maintained.

(5) Since the discharge part 10 includes the backflow preventing means, the liquid etc. can be prevented from flowing backward from the discharge part 10.

Second Embodiment

Figure 5:
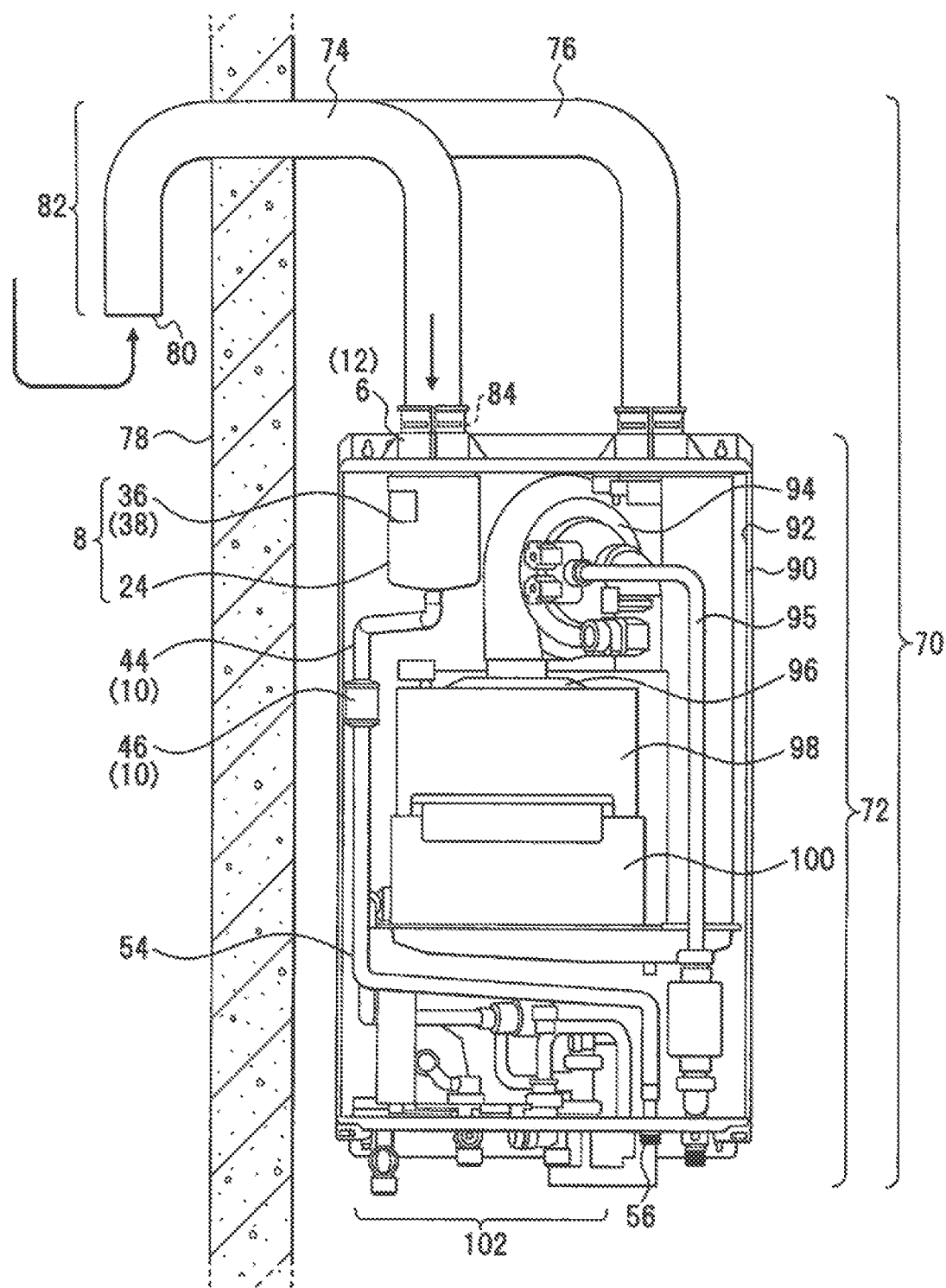
FIG. 5 is a view of a configuration example of a water heater according to a second embodiment.

FIG. 5 shows a configuration example of a water heater according to a second embodiment. The configuration shown in FIG. 5 is an example, and the present invention is not limited to this configuration. In FIG. 5, the same portions as FIGS. 1 to 4 are denoted by the same reference numerals.

A water heater 70 shown in FIG. 5 includes, for example, an apparatus main body part 72 including the filter device 2 of the present disclosure, an air supply pipe 74 supplying the outside air to the apparatus main body part 72, and an exhaust pipe 76 discharging a combustion exhaust discharged from the apparatus main body part 72.

The water heater 70 has the apparatus main body part 72 disposed inside a building such as a house and a cabin, and the air supply pipe 74 and the exhaust pipe 76 each have one end side arranged outdoors through a wall 78 of the building. At least the air supply pipe 74 has an outdoor-side opening part 80 directed downward. Thus, the air supply pipe 74 includes an elbow 82 bent at a portion led outdoor from the wall 78 or at a position near the opening part 80, for example. By directing the opening part 80 downward in this way, rainwater is prevented from flowing in directly or indirectly because of splashing due to contact with an object not shown. Additionally, the opening part 80 may include a filter preventing solid matter such as insects and fallen leaves not shown from mixing in, for example.

The air supply pipe 74 has an indoor-side opening part 84 inserted in the pipe connecting part 6 of the filter device 2. The pipe connecting part 6 may include a fixing means fixing a circumference of the air supply pipe 74 on the opening part 84 side, for example. The fixing means may be a fixing band.

The pipe connecting part 6 may have a function of adjusting a diameter of an opening portion according to the outer diameter of the air supply pipe 74 to be connected, for example. In this case, the pipe connecting part 6 has, for example, the air supply pipe accommodating part 12 (FIG. 1) accommodating the air supply pipe 74, and the ventilation pipe accommodating part 14 accommodating the ventilation pipe 28 of the filter device 2, and the air supply pipe accommodating part 12 and the ventilation pipe accommodating part 14 are made up of respective independent component.

[Configuration Example of the Apparatus Main Body Part 72]

The apparatus main body part 72 has, for example, an accommodating part 92 formed in an exterior housing 90, and the accommodating part 92 accommodates a function part performing a hot water supply process. The accommodating part 92 may be divided for each means, for example, or may be a single space. The accommodating part 92 is provided with, for example, an air supply fan 94, a gas supply pipe 95, a burner 96, a primary heat exchanger 98, a secondary heat exchanger 100, and a water and hot-water supply part 102. The air supply fan 94 is an example of a supplying means for supplying combustion air to the combustion means, takes in the air (Air) in the accommodating part 92 and causes the air (Air) to flow toward the combustion means. The air (Air) in which the liquid removed by the filter device 2 flows in the accommodating part 92.

The gas supply pipe 95 is an example of a pipe allowing a fuel gas G supplied from the outside of the apparatus main body part 72 to flow toward the burner 96.

The burner 96 is an example of the combustion means, mixes the air (Air) supplied from the air supply fan 94 and the fuel gas G supplied through the gas supply pipe 95 at a predetermined ratio, and combusts them. The burner 96 includes, for example, an igniter igniting the burner and a temperature sensor monitoring a combustion state.

The primary heat exchanger 98 and the secondary heat exchanger 100 are examples of a means having multiple pipes not shown arranged in accordance with the arrangement of the burner 96 for heat exchange between the combustion exhaust generated by the burner 96 and water or a heating medium flowing through the pipes.

The water and hot-water supply part 102 is an example of a means causing clean water to flow toward the primary heat exchanger 98 and the secondary heat exchanger 100 and a means causing hot water or a heat medium heated by the heat exchange to flow toward a hot-water supply load not shown.

The apparatus main body part 72 has the releasing part 56 of the filter device 2, for example, the releasing part 56 is disposed on the bottom side of the exterior housing 90, for example, and the separated liquid (Lm) and the solid matter (Sm) mixed in the liquid are discharged directly, or through a piping not shown, from the releasing part 56.

The disposed position of the releasing part 56 is not limited to the bottom side of the exterior housing 90 and may be disposed on a side-surface portion or a back-surface portion, for example. The discharge part 10 of the filter device 2 is adjusted in shape, arrangement position, and length of the discharge pipes 44, 54 depending on the disposed position of the releasing part 56 formed on the exterior housing 90.

[Effects of the Second Embodiment]

According to this configuration, the following effects can be obtained.

(1) The gas-liquid separating means can separate a flowing liquid together with an outside air or contained in the outside air, and supply air required for combustion.

(2) Since the filter device 2 is included inside the housing of the water heater, a replacement work is not necessary for a duct for supplying or discharging air at the time of installation of the water heater, so that a work load reduction, a user's convenience, and a cost reduction can be achieved.

(3) Since the diameter of the pipe connecting part 6 is adjustable according to the outer diameter of the existing air supply pipe 74, the existing air supply pipe 74 can be utilized in the building in which the water heater is installed, so that the convenience of the water heater is enhanced.

(4) The arrangement configuration of the discharge part 10 and the disposed position of the releasing part 56 can be adjusted according to the housing structure of the water heater.

(5) Since the filter device 2 is included in the accommodating part 92 of the water heater, the gas-liquid separation can be performed after the taken-in outside air is heated to a temperature equivalent to that inside the housing. As a result, the outside air is put into a state close to the state of being supplied to the combustion means, so that moisture condensed from the air can be separated in the filter device 2, and thus, the moisture can be restrained from mixing into the combustion means.

Third Embodiment

Figure 6:
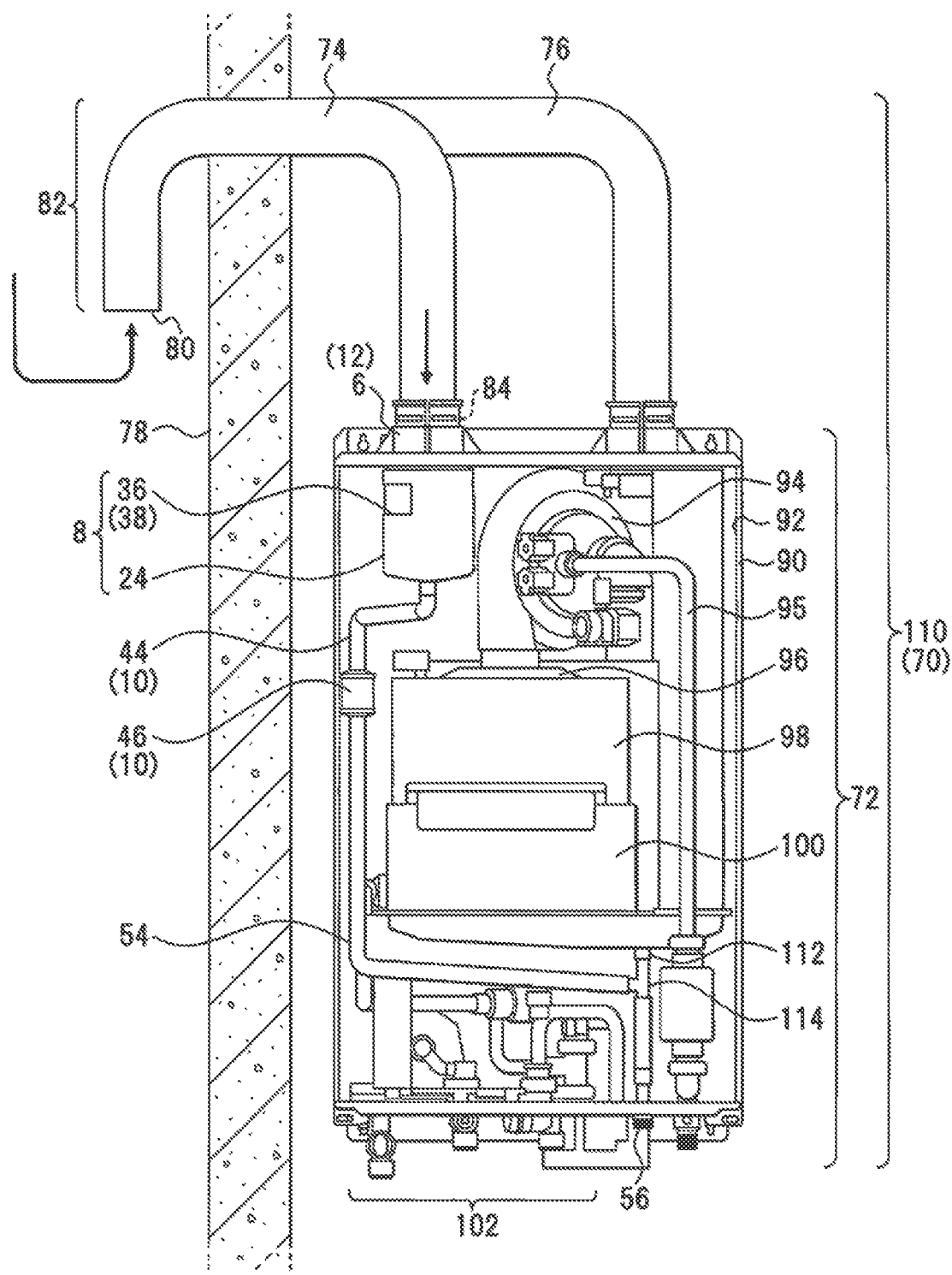
FIG. 6 is a view of a configuration example of a water heater according to a third embodiment.

FIG. 6 shows a configuration example of a water heater according to a third embodiment. The configuration shown in FIG. 6 is an example, and the present invention is not limited to this configuration. In FIG. 6, the same portions as FIGS. 1 to 5 are denoted by the same reference numerals.

A water heater 110 shown in FIG. 6 includes a drain discharge part 112 discharging a drain generated in heat exchange of the primary heat exchanger 98 and the secondary heat exchanger 100, for example, and the figure shows the case that the discharge part 10 of the filter device 2 is joined to the drain discharge part 112.

In the primary heat exchanger 98 and the secondary heat exchanger 100, a sensible heat and a latent heat are recovered from the combustion exhaust generated by the burner 96 through heat exchange with water or a heat medium flowing inside. In this process, a drain attributable to condensation of air inside the housing adheres to heat exchanger tubes due to reduction in temperature of the combustion exhaust. The water heater 110 includes a drain collecting means not shown for preventing the generated drain from dispersing in, or adhering to, an exhaust passage and for preventing the drain from being discharged from an unintended portion to the outside of the housing. The drain collecting means is made up of, for example, a drain collecting tray etc. arranged near the primary heat exchanger 98 and the secondary heat exchanger 100. The collected drain is discharged from a predetermined position through the drain discharge part 112 to the outside of the housing. The drain collecting means includes, for example, a means not shown neutralizing a component of the drain.

The filter device 2 disposed in the water heater 110 has the discharge pipe 54 connected to the drain discharge part 112 via a branch pipe 114 and discharges the liquid together with the drain, or independently of a discharge process of the drain, by using the common releasing part 56.

Effects of Third Embodiment

According to this configuration, the following effects can be obtained.

(1) Since waste materials such as a drain and liquid are discharged together without direct contact with a user of the water heater, the safety and convenience of water heater can be improved.

(2) It is not necessary to dispose multiple discharge pipes for waste materials in the housing of the water heater, so that the assembling and the installation process of the apparatus can be simplified.

Example

Figure 7:
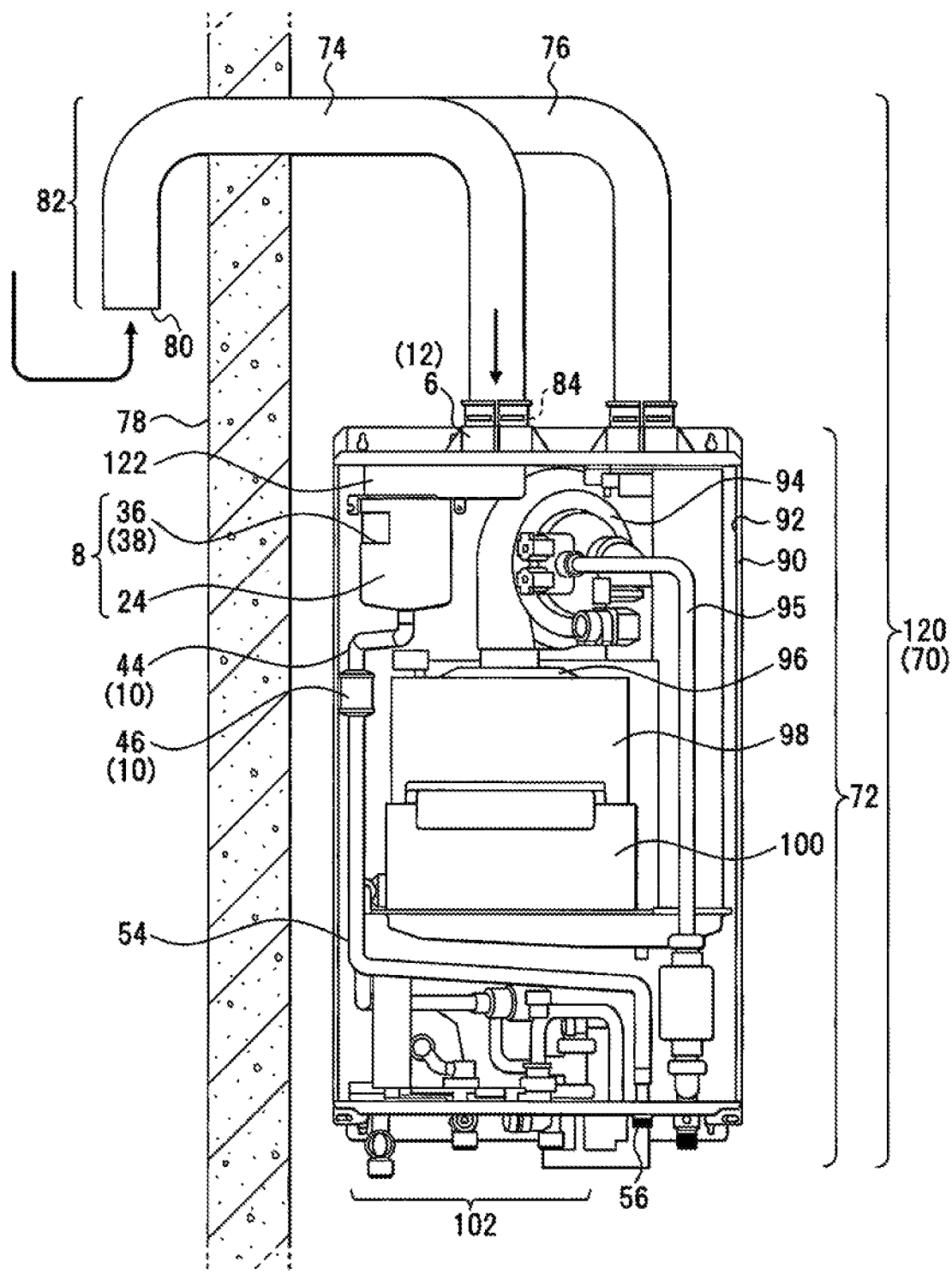
FIG. 7 is a view of a configuration example of a water heater according to an example.

FIG. 7 shows a configuration example of a water heater according to an example. The configuration shown in FIG. 7 is an example, and the present invention is not limited to this configuration.

In a water heater 120 shown in FIG. 7, for example, the pipe connecting part 6 and the filter main body part 8 of the filter device 2 do not communicate on a straight line and the water heater 120 includes a connecting pipe 122 allowing the outside air taken in from the pipe connecting part 6 to flow toward the filter main body part 8.

The connecting pipe 122 is tightly connected to the pipe connecting part 6 and the filter main body part 8, for example, and has a structure not allowing the outside air to leak into the accommodating part 92 of the water heater 120. Additionally, for example, a pipe not shown inserted into the ventilation pipe accommodating part 14 of the pipe connecting part 6 and a connecting part connected to the opening part of the ventilation pipe 28 of the filter main body part 8 is formed on the inside of the connecting pipe 122.

In the water heater 120, the disposed position of the filter main body part 8 relative to the disposed position of the air supply pipe 74 is limited due to, for example, the size of the accommodating part 92 in the exterior housing 90 and the arrangement and size of a hot-water supply function part disposed in the accommodating part 92, and the filter main body part 8 cannot be arranged on the lower side of the air supply pipe 74. Thus, in the filter device 2, the pipe connecting part 6 and the filter main body part 8 are connected through the connecting pipe 122.

[Effects of Example]

According to this configuration, the following effects can be obtained.

(1) Since the outside air can be taken in through the connecting pipe 122 and the air supply pipe 74 connected to the outside of the exterior housing, the filter main body part 8 including the gas-liquid separating means is increased in the degree of freedom of the disposed position and improved in convenience.

(2) Since the arrangement position of the filter device 2 can be adjusted depending on the size of the exterior housing of the water heater, contribution can be made to miniaturization of the apparatus.

(3) By allowing the outside air to flow toward the filter main body part 8 through the connecting pipe 122 arranged in the accommodating part 92, the taken-in outside air can be put into a state close to the temperature of the accommodating part 92, and dew condensation water can be separated in the filter device 2.

OTHER EMBODIMENTS (1) In the embodiments and the example, the liquid (Lm) separated by the filter device 2 and the solid matter (Sm) mixed in the liquid are discharged at all times from the discharge part 10. However, the present invention is not limited thereto. The discharge part 10 may include a means temporarily storing the liquid and may discharge the liquid to the outside at predetermined timing. The liquid storage means may include a storage means, an opening/closing valve, etc. in the discharge pipe 44, for example. For the control of the discharge timing, the filter device 2 may include an independent control means, or the control may be provided by a control part of the water heater in which the filter device 2 is disposed.

If the liquid is discharged through the drain discharge part 112 of the water heater, the liquid discharge process may be performed in conjunction with the drain discharge timing of the water heater.

(2) The outer housing 24, the ventilation pipe 28, and the outflow hole 36 of the filter device 2 may be made adjustable in terms of size and arrangement position according to the environment in which the filter device 2 and the water heater are disposed. Specifically, one or more of the inner diameter and the length of the ventilation pipe 28 and the outer housing 24 may be increased in size to make the height H1 of configuration of the gas-liquid separating means adjustable according to the moisture amount of the outside air taken in through the air supply pipe and the surrounding climatic environment. Such a configuration can provide an improved gas-liquid separating function and a filter function corresponding to the environment in which the water heater is used.

(3) In the example, the connecting pipe 122 connecting the pipe connecting part 6 and the filter main body part 8 is disposed in the exterior housing 90 of the water heater. However, the present invention is not limited thereto. For example, the connecting pipe 122 may be disposed on the exterior side of the exterior housing 90 together with the pipe connecting part 6.

Aspects of the embodiments or the example described above are as follows.

An aspect of the filter device includes a supply air introducing part, a filter main body part and a discharge part. The supply air introducing part takes in an outside air through the air supply pipe to be connected to the supply air introducing part. The filter main body part includes a ventilation pipe connected to the supply air introducing part to allow the outside air to flow through the ventilation pipe and a filter housing part in which a flow-through part is formed. The filter housing part allows the outside air entering from an opening part of the ventilation pipe to flow through the flow-through part. The opening part of the ventilation pipe is arranged in the filter housing part. The filter housing part is equipped with an outflow hole allowing the outside air to flow outside the flow-through part at a position higher than a position of the opening part to form a gas-liquid separating means separating, from the outside air, a liquid in a liquid state or a state close thereto. The liquid is taken in together with the outside air. The discharge part discharges, from the filter main body part, at least the liquid separated by the gas-liquid separating means.

In the filter device, the filter main body part may further include a filter disposed in the outflow hole and blocking passage of solid matter.

In the filter device, the filter main body part may include a discharge hole arranged at a position lower than at least the position of the opening part of the ventilation pipe. The discharge hole may collect and allow the liquid separated by the gas-liquid separating means to flow toward the discharge part.

In the filter device, the discharge part may include a pipe allowing the liquid separated by the gas-liquid separating means to flow through the pipe, and a backflow preventing means preventing the liquid from flowing backward, on the pipe.

In the filter device, the filter device may further include a connecting pipe arranged between the supply air introducing part and the filter main body part. The connecting pipe may allow the outside air flowing through the air supply pipe to pass through the connecting pipe and to flow toward the filter main body part.

In the filter device, the discharge part may be connected to a drain discharge part of a water heater in which a drain is generated by a heat exchange process to allow the collected liquid to flow to the drain discharge part.

An aspect of the water heater includes a combustion means and a heat exchanger. The combustion means generates combustion exhaust. The heat exchanger heats water or a heating medium with the combustion exhaust. The water heater includes a filter device separating at least a liquid from the outside air entering from the air supply pipe taking an outdoor outside air into a housing of the water heater. The filter device allows the outside air to flow toward the combustion means. The filter device includes a supply air introducing part, a filter main body part and a discharge part. The supply air introducing part takes in the outside air through the air supply pipe to be connected to the supply air introducing part. The filter main body part includes a ventilation pipe connected to the supply air introducing part to allow the outside air to flow through the ventilation pipe and a filter housing part in which a flow-through part is formed. The flow-through part allows the outside air entering from an opening part of the ventilation pipe to flow through the flow-through part. The opening part of the ventilation pipe is arranged in the filter housing part. The filter housing part is equipped with an outflow hole allowing the outside air to flow outside the flow-through part at a position higher than a position of the opening part to form a gas-liquid separating means separating, from the outside air, the liquid in a liquid state or a state close thereto. The liquid is taken in together with the outside air. The discharge part discharges, from the filter main body part to the outside of the housing of the water heater, at least the liquid separated by the gas-liquid separating means.

In the water heater, the filter main body part may further include a filter disposed in the outflow hole and blocking passage of solid matter.

In the water heater, the water heater may include a drain discharge part disposed under the heat exchanger. The drain discharge part may collect and discharge a heat exchange generated drain to the outside of the housing of the water heater. The discharge part of the filter device may be connected to the drain discharge part so that the collected liquid is discharged through the drain discharge part.

According to aspects of the embodiments, any of the following effects can be obtained.

(1) The gas-liquid separating means of the filter device can separate a liquid in the liquid state or a state close thereto from a taken-in outside air to allow the outside air necessary for combustion to flow toward the combustion means.

(2) Adhesion, accumulation, etc. of liquid can be prevented for the combustion means, the air supply means, etc., and abnormal combustion of the combustion means can be prevented.

(3) When the separated liquid is discharged through the discharge part from the filter main body, the solid matter etc. separated from the outside air are discharged together with the liquid to prevent deterioration of the filter function while maintaining the air permeability for allowing passage of the outside air toward the combustion means.

As described above, the most preferable embodiments etc. of the present disclosure have been described. The present invention is not limited to the above description. Various modifications and changes can be made by those skilled in the art based on the spirit of the invention described in claims or disclosed in detailed description of the invention. Such modifications and changes obviously fall within the scope of the present disclosure.

The filter device and the water heater of the present disclosure are useful since rainwater and condensed moisture can be separated from an outside air taken in through the air supply pipe from outdoors.

The invention claimed is:

1. A water heater including a combustion means and a heat exchanger, the combustion means being configured to generate combustion exhaust, the heat exchanger being configured to heat water or a heating medium with the combustion exhaust, the water heater comprising:
   a filter device being configured to separate at least a liquid from the outside air entering from the air supply pipe, the air supply pipe being configured to take an outdoor outside air into a housing of the water heater, the filter device being configured to allow the outside air to flow toward the combustion means, wherein
   the filter device includes
   a supply air introducing part including an opening having a shape corresponding to an outer shape of the air supply pipe so as to be configured to be connected to the air supply pipe, the supply air introducing part being configured to take in the outside air through the air supply pipe,
   a filter main body part including a ventilation pipe and a filter housing part, the ventilation pipe being connected to the supply air introducing part, a part of the ventilation pipe being arranged inside the filter housing part to form a ventilation space between the ventilation pipe and the filter housing part, the ventilation pipe having an opening part, the filter housing part including an outflow hole located at a position higher than a position of the opening part so as to be configured such that the outside air flowing in the ventilation pipe flows through the opening part, the ventilation space and the outflow hole into an outside of the ventilation space and the liquid in a is separated from the outside air by locating the outflow hole at the position higher than the position of the opening part, and
   a discharge part being configured to discharge the separated liquid from the filter main body part to the outside of the housing of the water heater, wherein
   the water heater further comprises a drain discharge part disposed under the heat exchanger, the drain discharge part being configured to collect and discharge condensed water generated by a heat exchange to the outside of the housing of the water heater, and wherein
   the discharge part of the filter device is connected to the drain discharge part so that the collected liquid is discharged through the drain discharge part.

2. The water heater according to claim 1, wherein
   the filter main body part further includes a filter, and
   the filter is disposed on the outflow hole so as to be configured to block passage of solid matter.

3. The water heater according to claim 1, wherein
   the filter main body part includes a discharge hole located at a position lower than at least the position of the opening part of the ventilation pipe, and the discharge hole is configured to collect and allow the separated liquid to flow toward the discharge part.

4. The water heater according to claim 1, wherein
   the discharge part includes a pipe and a backflow preventing means placed on the pipe,
   the pipe is configured such that the separated liquid flows through the pipe into the backflow preventing means, and
   the backflow preventing means includes a case part formed larger in diameter than the pipe and a check valve disposed in the case part and is configured to prevent the liquid from flowing backward.

5. The water heater according to claim 1, further comprising a connecting pipe arranged between the supply air introducing part and the filter main body part, the connecting pipe allowing the outside air flowing through the air supply pipe to pass through the connecting pipe and to flow toward the filter main body part.

* * * * *